United States Patent [19]

Pakull et al.

[11] Patent Number: 5,357,028
[45] Date of Patent: Oct. 18, 1994

[54] METHOD OF PREPARING POLYCARBONATES AND POLYESTER CARBONATES

[75] Inventors: Ralf Pakull, Köln; Gerhard Fennhoff, Willich; Werner Strüver; Jürgen Kirsch, both of Leverkusen, all of Fed. Rep. of Germany

[73] Assignee: Bayer Aktiengesellschaft, Leverkusen, Fed. Rep. of Germany

[21] Appl. No.: 127,918

[22] Filed: Sep. 28, 1993

[30] Foreign Application Priority Data

Oct. 5, 1992 [DE] Fed. Rep. of Germany ....... 4233345

[51] Int. Cl.⁵ .............................................. C08G 64/00
[52] U.S. Cl. ..................................... 528/196; 528/199
[58] Field of Search ............................... 528/196, 199

[56] References Cited

U.S. PATENT DOCUMENTS

| | | | |
|---|---|---|---|
| 3,143,525 | 8/1964 | Ott | 528/199 |
| 3,211,775 | 10/1965 | Stephens et al. | |
| 3,220,975 | 11/1965 | Fox | |
| 3,254,051 | 5/1966 | Schmitt | 528/199 |
| 3,879,347 | 4/1975 | Serini et al. | 528/125 |
| 4,316,980 | 2/1982 | Idel et al. | 528/199 |
| 4,346,210 | 8/1982 | Alewelt et al. | 528/199 |
| 4,612,386 | 9/1986 | Renga | 560/86 |
| 4,617,368 | 10/1986 | Freitag et al. | 528/126 |

FOREIGN PATENT DOCUMENTS

| | | |
|---|---|---|
| 196429 | 10/1986 | European Pat. Off. . |
| 4030708 | 4/1992 | Fed. Rep. of Germany . |
| 47-11447 | 6/1972 | Japan . |

*Primary Examiner*—John Kight, III
*Assistant Examiner*—Terressa Mosley
*Attorney, Agent, or Firm*—Joseph C. Gil; Aron Preis

[57] ABSTRACT

A catalytic method for preparing thermoplastic carbonate polymers is disclosed. In the method according to the interfacial polycondensation process or the homogeneous solution process, resins which containing catalytically active groups are used as catalysts. The resulting resins are characterized by their color stability and temperature stability.

11 Claims, No Drawings

METHOD OF PREPARING POLYCARBONATES AND POLYESTER CARBONATES

The present invention relates to a method of preparing thermoplastic polycarbonates and thermoplastic polyester carbonates from diphenols, carbonate donors, optionally aromatic and/or aliphatic dicarboxylic acids or dicarboxylic acid dichlorides and/or chain terminators and optionally branching agents, by the interfacial process or the homogeneous solution process methods with the use of catalysts. The method is characterized in that resins containing catalytically active groups are used as the catalysts.

The terms polycarbonate and polyester carbonate also include copolycarbonate and copolyester carbonate copolymers.

The foregoing abbreviated description therefore relates to the following six reaction variants:

1. Diphenols carbonate donors,
2. Diphenols+carbonate donors+dicarboxylic acid dichlorides,
3. Diphenols+carbonate donors+chain terminators,
4. Diphenols+carbonate donors+dicarboxylic acid dichlorides+chain terminators,
5. Diphenols+carbonate donors+chain terminators+branching agents,
6. Diphenols+carbonate donors+dicarboxylic acid dichlorides+chain terminators+branching agents.

In the relevant variants of the method, dicarboxylic acids or their anhydrides may be used instead of dicarboxylic acid dichlorides. In still another variant of the method hydroxycarboxylic acids or -chlorides or other derivates thereof, may be used additionally or alternatively to the dicarboxylic acid dichlorides.

The preparation of polycarbonates and polyester carbonates by the two-phase interfacial process with the use of catalysts is known, and is described, for example, in U.S. Pat. No. 3,220,975, JP 11447/1972 and EP 753. In these methods the catalyst is added after phosgenation of the reaction mixture in solution in alcohol and/or bisphenol; the catalysts therefore have to be removed from the polycarbonate solution obtained after reaction in order to obtain color-fast, temperature resistant polycarbonates.

Removal of the catalyst itself is also necessary in the solution process for the preparation of polycarbonates and polyester carbonates.

U.S. Pat. No. 3,211,775 is noted to have disclosed a process for preparing an aromatic ester of chloroformic acid entailing a catalytic reaction of phosgene with a phenol. The catalyst is a synthetic polymeric resin containing as the fictional portion a number of groups selected from among secondary and tertiary amino groups and their salts.

In contrast to this, the method according to the invention provides polycarbonates and polyester carbonates which in addition to color-stability show temperature-stability.

Moreover, the method according to the invention has the advantage that the catalyst resin can easily be removed from the reaction mixture and re-used. This simplifies the working up of the reaction solution.

Suitable resins are those corresponding to general formulae (I)–(VI).

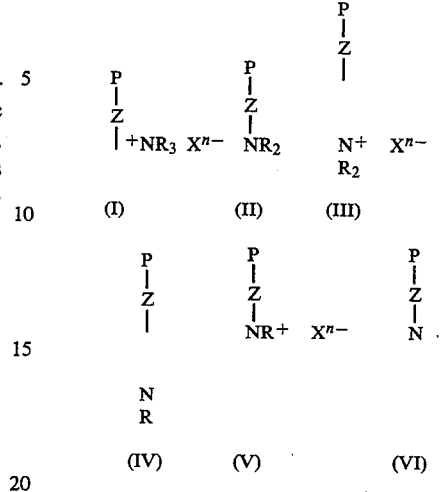

where
- P represents a cross-linked base polymer which is insoluble in common solvents;
- Z represents a bond between the N atom and the base polymer P, wherein Z may be a single bond, or $-(CH_2)_n-$ with $n=1-18$, or any other radical containing two bonds,
- N represents a nitrogen atom, wherein in general formulae (III) to (VI) the nitrogen atom N may be part of an aliphatic or aromatic ring system which is itself substituted;
- R represents a substituent of the nitrogen atom N, wherein R may independently represent the same or different entities, and may constitute a hydrogen atom, a heteroatom, a $C_1$–$C_{18}$ alkyl group, and in the case of general formulae (III)–(VI) may be a cycloalkyl, dicycloalkyl and/or bridged dicycloalkyl radical with the nitrogen atom N forming part of the ring structure, and may also represent a $C_6$–$C_{60}$ aryl radical, wherein the substituents themselves may be substituted and wherein the R radicals may contain incorporated heteroatoms such as $-O-$, $-S-$ and/or $=N-$.

The base polymer P is either an addition polymer or a condensation polymer. Addition polymers are preferred. Simple unsaturated compounds serve as monomers for the preparation of the addition polymer; these are preferably compounds corresponding to general formula (VII)

$$H_2C=CRD \qquad (VII)$$

where
- R represents H or methyl or any aliphatic radical with 2 to 18 C atoms, and
- D represents an optionally substituted aryl radical with 6 to 60 C atoms, a carboxyl group, an ester group and/or an amide group, in combination with polyunsaturated compounds which are suitable for cross-linking.

The preferred polyunsaturated compounds comprise aromatic compounds substituted with more than one vinyl group, esters and amides of unsaturated acids with polyhydric alcohols, and amines, dienes and divinyl ethers of polyhydric alcohols, divinyl benzene being particularly preferred.

The degree of functionality, measured as the active groups per repeat unit of the base polymer P, is 0.3 to 1.3, preferably 0.5 to 1.

Suitable resins comprise addition polymers and/or condensation polymers with degrees of cross-linking from 0.5 to 80%, preferably 3 to 40%, most preferably 4 to 10%. Examples of such resins comprise cross-linked polyesters and/or cross-linked polyamides, and cross-linked addition polymers such as cross-linked polymethyl methacrylate. Polystyrene cross-linked with divinyl benzene is particularly preferred.

Preferred substituents R on the nitrogen atom of compounds (I) to (VI) comprise —H, —CH$_3$, C$_2$H$_5$, C$_2$H$_4$OH and/or —CH$_2$C$_6$H$_5$ and, with the proviso that two R radicals form part of a ring system with the nitrogen atom N, e.g. piperidine, piperazine or pyrrolidine structures, may comprise bicyclic aza compounds or bridged bicyclic aza compounds.

The preferred anions X$^n$ comprise Cl—, OH— and SO$_4$——.

The internal structure of the resins may be gel-like or macroporous.

A preferred form of catalyst resin is the bead form. The diameter of the individual beads is preferably 0.2 to 2 mm. Another preferred use of the catalyst resin is in powder form (particle diameter <0.2 mm).

Some of the resins which are suitable according to the invention are also known as ion-exchange resins, and are commercially available as Lewatit ® or Wofatit ®, for example.

The polycarbonates and polyester carbonates obtainable according to the invention have average molecular weights Mw (weight average) between 10,000 and 200,000, preferably between 20,000 and 100,000 (determined by measuring the relative viscosity of a solution in CH$_2$Cl$_2$ in the known manner, for example).

Examples of suitable diphenols include: hydroquinone, resorcinol, dihydroxydiphenyls, bis-(hydroxyphenyl )-alkanes, bis-(hydroxyphenyl )-cycloalkanes, bis-(hydroxyphenyl)-sulphides, bis-(hydroxyphenyl)-ketones, bis-(hydroxyphenyl) -sulphoxides, α,α'-bis-(hydroxyphenyl)-diisopropylbenzenes, and their compounds comprising alkylated and/or halogenated nuclei.

Examples of preferred diphenols include 2,2-bis-(4-hydroxyphenyl)-propane, 2,4-bis-(4-hydroxyphenyl )-2-methylbutane, 1,1-bis-(4-hydroxyphenyl )-p-di isopropylbenzene, 2,2-bis-(3-methyl -4-hydroxyphenyl )-propane, 2,2-bis-(3-chloro-4-hydroxyphenyl)-propane, bis-(3,5-dimethyl-4-hydroxphenyl-methane, 2,2-bis-(3,5-dimethyl -4-hydroxphenyl )-propane, bis-(3,5-dimethyl-4-hydroxphenyl )-sulphone, 2,4-bis-(3,5dimethyl-4-hydroxphenyl ) -2-methyl butane, 1,1-bi s- (3,5-dimethyl-4-hydroxyphenyl )-p-diisopropylbenzene, 2,2-bis-(3,5-dibromo-4-hydroxphenyl )-propane, and 1,1-bis-(4-hydroxyphenyl)- 3,3,5-trimethyl cycl ohexane.

Examples of particularly preferred diphenols include 4,4'-dihydroxydiphenyl, 4,4'-dihydroxydiphenyl sulphide, 2,2-bi s-(4-hydroxyphenyl )-propane, 2,2-bi s-(3,5-dimethyl -4-hydroxphenyl)-propane, 2,2-bis-(3,5-dichloro-4-hydroxphenyl)-propane, 2,2-bis-(3,5-dibromo-4-hydroxphenyl )-propane, 1,1-bis-(4-hydroxyphenyl )-cyclohexane, and 1,1-bis-(4-hydroxyphenyl)-3,3,5-trimethylcyclohexane.

Examples of suitable branching agents include 4,6-dimethyl - 2,4,6- tri - ( 4-hydroxyphenyl ) -heptene- 2, 4,6-dimethyl-2,4,6-tri-(4-hydroxyphenyl)-heptane, 1,3,5-tri-(4-hydroxyphenyl )-benzene, 1,1,1-tri-(4-hydroxyphenyl)-ethane, tri-(4-hydroxyphenyl )-phenylmethane, 2,2-bis- [4,4-bis-(4-hydroxyphenyl)-cyclohexyl]-propane, 2,4-bis-(4-hydroxyphenyl-isopropyl)-phenol, 2,6-bis-(2-hydroxy-5'-methyl benzyl )-4-methylphenol, 2- ( 4-hydroxyphenyl ) -2- ( 2,4-hydroxyphenyl ) -propane, hexa-(4-(4-hydroxyphenyl isopropyl )-phenyl )-ortho-terephthalic acid ester, tetra-(4-hydroxyphenyl )-methane, tetra- (4-(4-hydroxyphenyl-isopropyl)-phenoxymethane, and 1,4-bis-(4',4''-dihydroxytriphenyl )-methyl )-benzene, and in particular α,α',α''-tris-(4-hydroxyphenyl) - 1,3,5-triisopropenylbenzene.

Other possible branching agents include 2,4-dihydroxybenzoic acid, trimesic acid, cyanuric chloride and 3,3-bis-(3-methyl-3-hydroxyphenyl )-2-oxo-2,3-dihydroindole.

Examples of suitable dicarboxylic acid dichlorides include those of terephthalic acid, isoterephthalic acid, tert.-butyl isophthalic acid, 3,3'-diphenyldicarboxylic acid, 4,4'-diphenyldicarboxylic acid, 3,3'-benzophenonedicarboxylic acid, 4,4'-benzophenonedicarboxylic acid, 3,4'-benzophenonedicarboxylic acid, 4,4'-diphenyletherdicarboxylic acid, 4,4'-diphenylsulphonedicarboxylic acid, 2,2'-bis-(4-carboxyphenyl)-propane, and trimethyl-3-phenylindane-4,5'-dicarboxylic acid.

Chlorides of phenolcarboxylic acids may also be used instead of or together with dicarboxylic acid dichlorides for the preparation of the polyester carbonates, for example the acid chlorides of p-hydroxybenzoic acid, m-hydroxybenzoic acid, o-hydroxybenzoic acid, 4-hydroxy-4'-carboxydiphenyl, 4-hydroxy-4'-carboxydiphenyl ether, and of 4-hydroxy-4'-carboxydiphenyl sulphone may be used.

Examples of suitable chain terminators include the chain terminators disclosed in DE-OS 3,919,553 or other conventional chain terminators, i.e. low molecular weight monophenols such as phenol itself, or benzoyl chloride, particularly monoalkyl phenols or dialkyl phenols with up to 20 C atoms in the alkyl substituents.

In addition to phosgene, suitable carbonate donors for the method according to the invention include chloroformic acid esters of bisphenols, triphosgene, and all other carbonate donors also.

The preparation of polycarbonates and polyester carbonates according to the invention may be carried out by the two-phase interfacial process, for example. Diphenols, particularly dihydroxydiarylalkanes or -cycloalkanes, are suitable for this purpose; in addition to unsubstituted dihydroxydiarylalkanes or -cycloalkanes as such, those which comprise substituents in the o- or p- position in relation to the phenolic hydroxy groups are also suitable, dissolved in an aqueous alkaline phase. Chain terminators and optional branching agents may also optionally be used in addition, a suitable solvent for the polycarbonate, copolycarbonate, polyester carbonate and/or copolyester carbonate being added. Phosgene is then introduced at a temperature between 0 and 100° C. and at a pH between 8 and 14, and a dicarboxylic acid dichloride is optionally added. Polycondensation is effected after phosgenation, e.g. by passing the emulsion over the resin containing catalytically active groups to be used according to the invention in a tubular reactor, or by stirring the emulsion with the resin containing catalytically active groups in an agitated vessel. The chain terminators which are optionally used in addition and the optional branching agents may be added before, during or after phosgenation; the chain terminators which are optionally used in addition and the optional branching agents may also be added before, during or after contact of the emulsion with the resin. Phosgene is introduced for periods between 1 second and 20 minutes, and contact with the resin containing catalytically active groups lasts for between 1 second and 120 minutes. In order to isolate the polycarbonates and polyester carbonates produced, the organic polymer solution is removed, neutralized, and washed with water until it is free from electrolytes. The polycarbonates, copolycarbonates, polyester carbonates and/or copolyester carbonates may then be isolated by known methods, e.g. by removing the solvent by evaporation, by precipitation using solvents in which they are insoluble, or by crystallization.

In an analogous manner, the solution process may also be used for the preparation according to the invention of polycarbonates and polyester carbonates. In this method the diphenols (as described above) are dissolved in a solvent, phosgene is introduced at temperatures between 0° and 100° C., and dicarboxylic acid dichloride is optionally added; chain terminators and/or branching agents may also optionally be used in addition. Polycondensation is then effected, e.g. by passing the solution over the resin containing catalytically active groups in a tubular reactor, or by stirring the solution with the resin containing the catalytically active groups in an agitated vessel. The chain terminators which may optionally also be used and the optional branching agents may be added before, during or after phosgenation; the chain terminators which may optionally also be used and the optional branching agents may also be added before, during or after the contact of the solution with the resin. Phosgene is introduced for periods between 1 second and 120 minutes, and contact with the resin containing catalytically active groups lasts for between 1 second and 120 minutes. The polycarbonates and polyester carbonates may then be isolated by known methods, e.g. by removing the solvent by evaporation, by precipitation using solvents in which they are insoluble, or by crystallization.

In both variants of the method of preparation, the amount of phosgene and optional dicarboxylic acid dichloride added in relation to the diphenol, optional multifunctional phenols and optional monofunctional phenols used amounts to 100 to 300 mole % preferably 105 to 200 mole %, most preferably 110 to 160 mole %.

The amount of chain terminators used is 0 to 10 mole % preferably 0.5 to 8 mole % most preferably 1 to 2.5 mole % based on the amount of diphenols used.

The amount of branching agents used is 0 to 5 mole % preferably 0 1 to 4 mole % most preferably 0 2 to 3 mole ° based on the amount of diphenols used.

When chlorides of phenolcarboxylic acids are used in addition, the proportion of chloride functional groups and phenol functional groups to be added may be determined by the person skilled in the art from the above disclosure together with his expert knowledge.

The polycarbonates and polyester carbonates obtainable by the method according to the invention may be processed in the usual manner to produce any desired moldings using conventional machinery. The usual additives such as stabilizers, flame-retardants, pigments, fillers or glass fibers may be added in known amounts before or during processing.

The polycarbonates and polyester carbonates obtainable by the method according to the invention may be used and processed commercially in the known manner in the fields of electrical technology and optics, as film and sheet for example.

The invention is further illustrated but is not intended to be limited by the following examples in which all parts and percentages are by weight unless otherwise specified.

EXAMPLES

Example 1

Preparation of a Polycarbonate

The following reagents were weighed into a 2 liter flask fitted with a stirrer and baffles:

| | |
|---|---|
| 45.7 g | bisphenol-A |
| 35.2 g | sodium hydroxide flakes |
| 506 ml | water |
| 0.959 g | phenol |
| 359 ml | methylene chloride. |

Phosgene (31.7 g) was then introduced. After the addition of an ion-exchange resin (100 g) with trimethylammonium as the active group the mixture was stirred for a further 45 minutes. The ion-exchange resin was filtered off and the phases were separated and washed twice with water.

Comparative Example

Preparation of a Polycarbonate

The following reagents were weighed into a 2 liter flask fitted with a stirrer and baffles:

| | |
|---|---|
| 45.7 g | bisphenol-A |
| 35.2 g | sodium hydroxide flakes |
| 506 ml | water |
| 0.959 g | phenol |
| 359 ml | methylene chloride. |

31.7 g of phosgene was then introduced. After the addition of 0.2 ml ethyl piperidine, the mixture was stirred for a further 45 minutes. The mixture was acidified and the phases were separated and washed twice with water.

Examples 2–3

Preparation of Polycarbonates

Example 1 was repeated twice, using 100 g of the same ion exchange resin from the preceding preparation.

| | $\eta_{rel}$ |
|---|---|
| Example 1 | 1.196 |
| Comparison | 1.208 |
| Example 2 | 1.171 |
| Example 3 | 1.185 |

Example 4

Preparation of a Polyester Carbonate

The following reagents were weighed into a 1 liter flask fitted with a stirrer and baffles:

| | |
|---|---|
| 22.9 g | bisphenol-A |
| 17.6 g | sodium hydroxide flakes |
| 250 ml | water |
| 0.48 g | phenol |

| | |
|---|---|
| 175 ml | methylene chloride. |

14.9 g of Phosgene was then introduced, with the simultaneous addition of 2.0 g terephthalic acid chloride. 50 g of an ion exchange resin containing 1-azonium-1-ethylcyclohexane

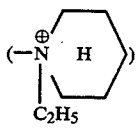

as the active group was then added, and the mixture was stirred for a further 45 minutes. The ion-exchange resin was then filtered off, and the phases were separated and washed twice with water. A polyester carbonate was obtained with a relative solution viscosity of 1.350.

Example 5

Preparation of a Copolycarbonate

The following reagents were weighed into a 1 liter flask fitted with a stirrer and baffles:

| | |
|---|---|
| 22.9 g | bisphenol-A |
| 17.6 g | sodium hydroxide flakes |
| 1.55 g | 1,1-bis-(4-hydroxyphenyl)-3,3,5-trimethylcyclohexane |
| 250 ml | water |
| 0.433 | phenol |
| 175 ml | methylene chloride |

15.8 g of Phosgene was then introduced. 50 g of an ion-exchange resin containing 1-azonium-1-ethylcyclohexane

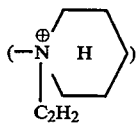

as the active group was then added, and the mixture was stirred for a further 45 minutes. The ion-exchange resin was then filtered off, and the phases were separated and washed twice with water. A copolycarbonate with a relative solution viscosity of 1.381 was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the interfacial polycondensation process of preparing thermoplastic carbonate polymers selected from the group consisting of polycarbonates, polyester carbonates, copolycarbonates and copolyester carbonates having a weight average molecular weight of 10,000 to 200,000 comprising reacting at least one diphenol with at least one carbonate donor, and with or without a dicarboxylic acid dichloride in the presence of catalysts, the improvement comprising using as a catalyst at least one resin conforming to

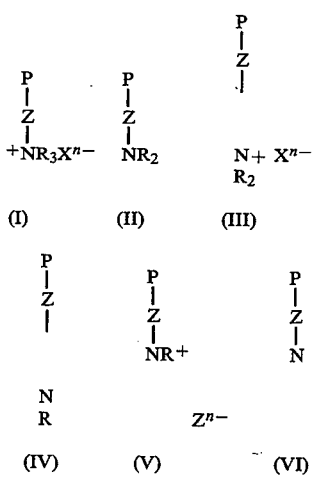

where

P represents a cross-linked base polymer which is either an addition polymer or a condensation polymer and is insoluble in common solvents;

Z presents a bond between the N atom and said P, and

R represents a substituent of the nitrogen atom N, said P having a degree of cross-linking of 0.5-80%.

2. The process of claim 1 wherein Z is selected from the group containing a single bond, $—(CH2)_n—$ with $n=1-18$ and any other radical containing two bonds.

3. The process of claim 1 wherein said R independently denotes a hydrogen atom a heteroatom a $C_1$-$C_{18}$ alkyl group and in formulae (III)-(VI) may additionally be a cycloalkyl, dicycloalkyl and/or bridged dicycloalkyl radical with the nitrogen atom N forming part of the ring structure, and may also represent a $C_6$-$C_{60}$ aryl radical.

4. The process of claim 1 wherein said P is an addition polymer.

5. The process of claim 1 wherein said P is selected from the group consisting of polyesters, polyamides, polymethyl methacrylate and polystyrene.

6. The process of claim 5 wherein said polystyrene is cross linked with divinyl benzene.

7. The process of claim 1 wherein said R is selected from the group consisting of —H, —$CH_3$, $C_2H_5$, $C_2H_4OH$ and —$CH_2C_6H_5$ and, with the proviso that two R radicals form part of a ring system with the nitrogen atom N.

8. The process of claim 2 wherein 0 to 10 mole % of chain terminators are co-reactants, said percent relative to the molar amount of said diphenol.

9. The process of claim 9 wherein 0 to 5 mole % of branching agents are co-reactants, said percent relative to the molar amount of said diphenol.

10. The process of claim 1 wherein carbonate donor is at least one member selected from the group consisting of phosgene, chloroformic acid ester of bisphenol and triphosgene.

11. The process of claim 10 wherein said carbonate donor is used in an amount of 100 to 300 mole % relative to the amount of said diphenol.

* * * * *

UNITED STATES PATENT AND TRADEMARK OFFICE
CERTIFICATE OF CORRECTION

PATENT NO. : 5,357,028          Page 1 of 2
DATED      : October 18, 1994
INVENTOR(S): Ralf Pakull et al It is certified that error appears in the above-indentified patent and that said Letters Patent is hereby corrected as shown below:

At column 1, line 55, correct "fictional" to --functional--.

At column 2, lines 5-15, delete formulas (III), (IV), (V), and (VI) and insert the following:

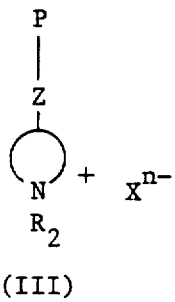 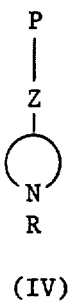 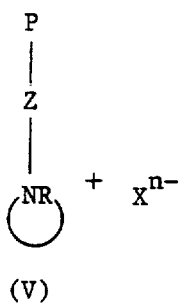 

(III)        (IV)        (V)        (VI)

At column 5, line 52, correct "0 1" to --0.1--. Also, correct "0 2" to --0.2--.

At column 5, line 53, correct "mole °" to --mole %--.

UNITED STATES PATENT AND TRADEMARK OFFICE
CERTIFICATE OF CORRECTION

PATENT NO. : 5,357,028
DATED : October 18, 1994
INVENTOR(S) : Ralf Pakull et al

It is certified that error appears in the above-indentified patent and that said Letters Patent is hereby corrected as shown below:

In Claim 1, at column 8, delete formulas (III), (IV), (V) and (VI) and insert the following:

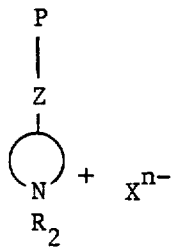  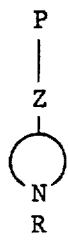  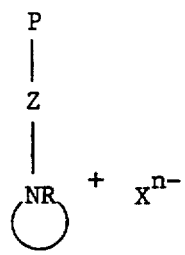  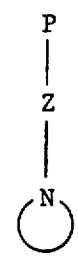

(III)　　　　(IV)　　　　(V)　　　　(VI)

Signed and Sealed this

Twenty-seventh Day of February, 1996

*Attest:*

BRUCE LEHMAN

*Attesting Officer*　　*Commissioner of Patents and Trademarks*